Feb. 27, 1968   G. M. JOHNSON   3,370,833
AUTO-TIRE HOSE GUARD
Filed Jan. 3, 1967   2 Sheets-Sheet 1
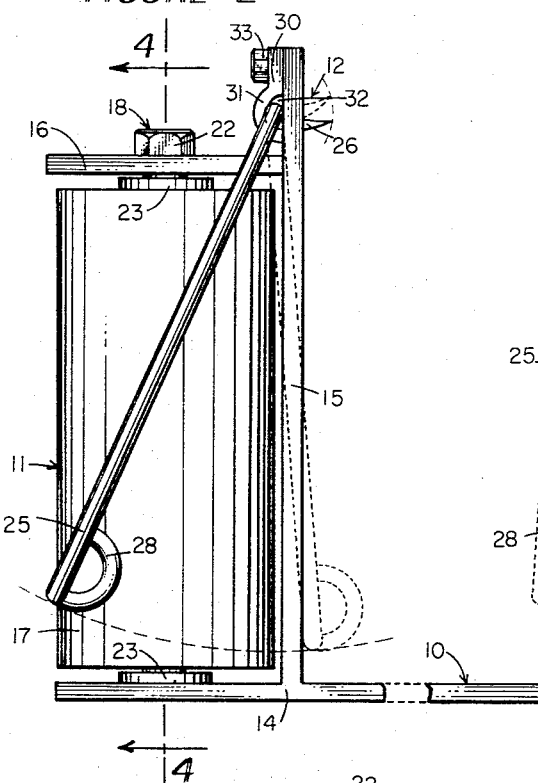
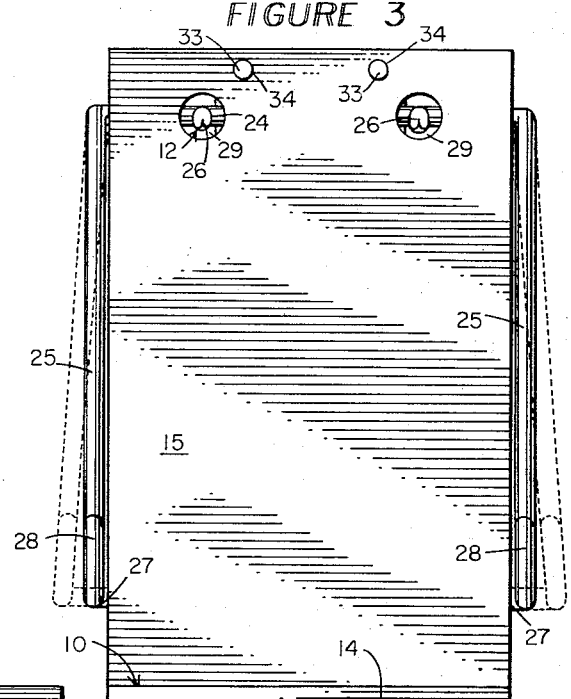
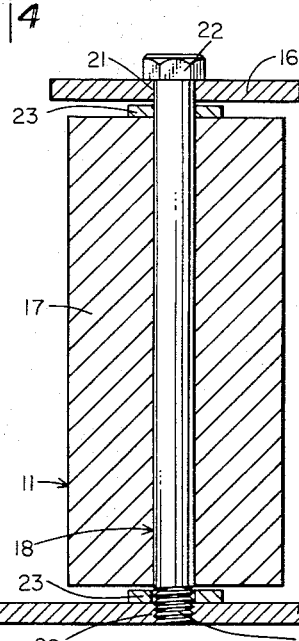
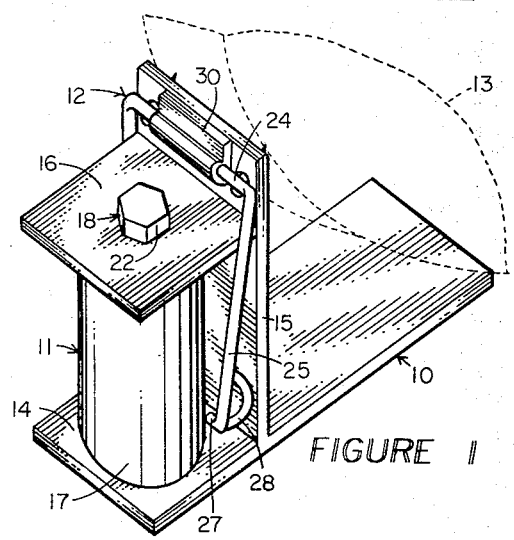
Glen M. Johnson, INVENTOR.
BY
ATTORNEY.

Feb. 27, 1968   G. M. JOHNSON   3,370,833
AUTO-TIRE HOSE GUARD
Filed Jan. 3, 1967   2 Sheets-Sheet 2
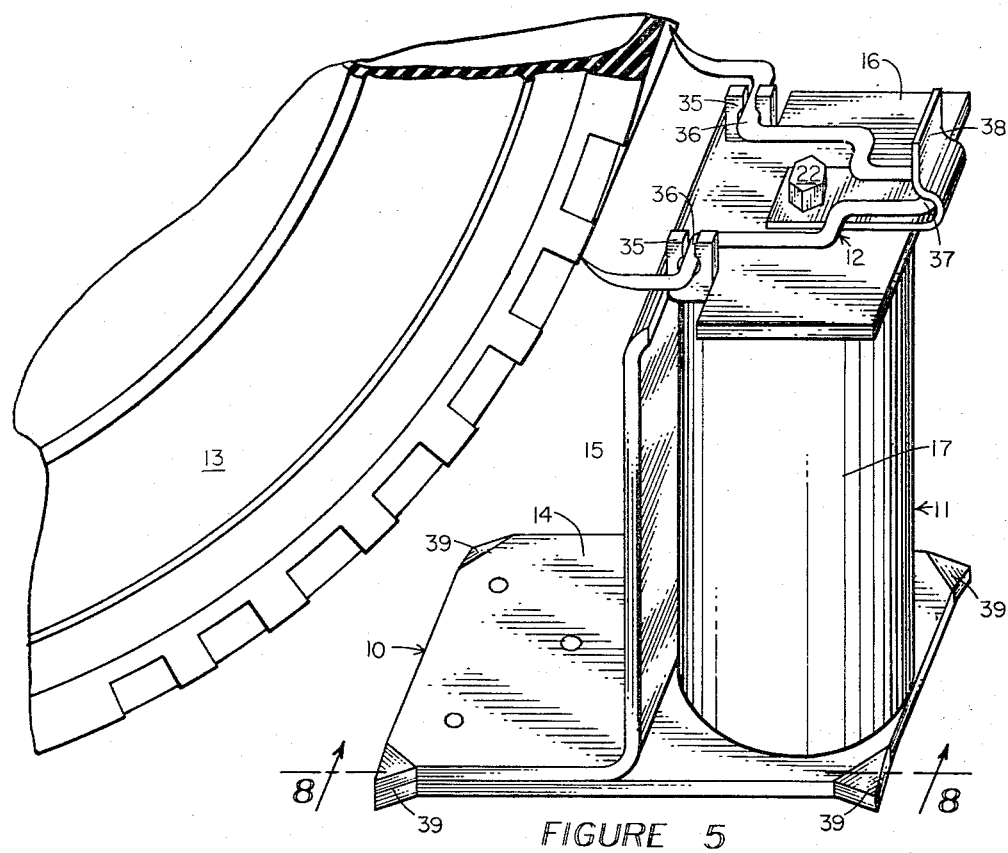
FIGURE 5
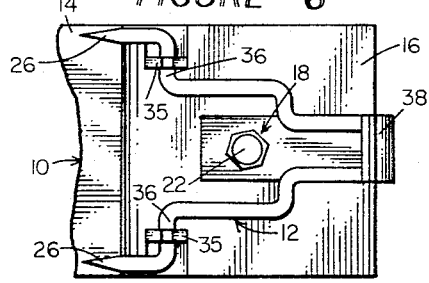
FIGURE 6
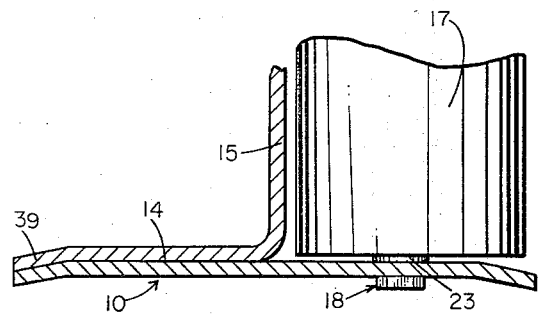
FIGURE 8
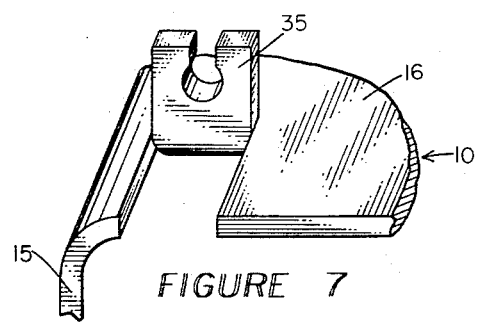
FIGURE 7
Glen M. Johnson, INVENTOR.
BY 
ATTORNEY.

United States Patent Office 3,370,833
Patented Feb. 27, 1968

3,370,833
AUTO-TIRE HOSE GUARD
Glen M. Johnson, 22 S. Jefferson St.,
Kennewick, Wash. 99336
Filed Jan. 3, 1967, Ser. No. 606,635
5 Claims. (Cl. 254—190)

ABSTRACT OF THE DISCLOSURE

A guard having a vertically orientated roller carried by a body structure adapted to releasably communicate with a mounted auto tire to prevent a hose used thereabout to become fouled between the tire and its supporting surface. The guard body is supported on the outer curved surface of the tire, between it and its supporting surface, by releasable fastening prongs to provide for simple positioning and removal.

My invention relates generally to a roller-type guard to prevent a flexible elongate member—such as a smaller hose—used about automotive vehicles from becoming fouled between a vehicle tire and its supporting surface when such member be moved about a vehicle and more particularly to such a hose guard having a body with releasable tire engaging prongs to maintain its position relative a tire and a vertically journaled guide roller to direct hose motion.

In the use of small diameter elongate flexible members, such as hose, about automotive vehicles, especially when the hose be moved about the vehicle, a problem has been experienced with the member becoming fouled in the acute angular area between a vehicle tire and the supporting surface there beneath. This problem is particularly present in the automotive painting field for if such a paint hose be shaken or violently moved to loosen it, dirt or debris is oftentimes thrown on a freshly painted surface with obvious deleterious results.

This problem has heretofore been recognized and various guide members have become known. It is the purpose of the instant invention to present improvements in such guides that give rise to a new and novel structure. In so doing, it is:

A principal object of my invention is to provide a hose guard releasably positionable relative a vehicle tire and the supporting surface thereunder to maintain a vertically journaled roller in position to prevent a flexible hose-like member from becoming frictionally engaged in the acute angular area between such vehicle tire and supporting surface.

A further object of my invention is to present such a guard that has a simply operated, pivotably disposed pointed locking device permitting the guard to be positioned relative a tire without any part being placed between the tire and its supporting surface.

A still further object of my invention is to provide such a guard that disposes the vertically positioned roller guide forwardly of a tire and substantially in the angular area between tire and supporting surface.

A still further object of my invention is to provide such a hose guard that is of new and novel design, of sturdy and durable nature, of simple and economic manufacture and one otherwise well adapted to the uses for which it is intended.

Other and further objects and purposes of my invention will appear from consideration of the following specification and accompanying drawings, which form a part of this application. In carrying out the objects of my invention, however, it is to be understood that its essential features are susceptible of change in design and structural arrangement with only one preferred and practical embodiment being illustrated in the accompanying drawings, as required.

In the drawings, wherein like numbers of reference refer to similar parts throughout:

FIGURE 1 is an isometric view of the principal species of my invention, showing its various parts, their configuration and relationship, and the positioning of the device relative a tire, partially shown in dotted outline.

FIGURE 2 is an orthographic, vertical side view of my invention at approximately its actual scale.

FIGURE 3 is an orthographic, vertical rear view of the same invention illustrated in FIGURE 2, showing its parts from this aspect.

FIGURE 4 is a cross-sectional view of the invention of FIGURE 2, taken on the line 4—4 thereon in the direction indicated by the arrows, to show particularly the roller journaling structure.

FIGURE 5 is an isometric view of a specie of my invention having top mounted tire engaging prongs.

FIGURE 6 is an orthographic top view of the specie of FIGURE 5.

FIGURE 7 is a partial orthographic view of the pivot structure mounting the tire engaging prong.

FIGURE 8 is a partial cross-sectional view of the base plate and vertical body structure of the specie, taken on the line 8—8 of FIGURE 5, in the direction indicated by the arrows thereon.

Referring now to the drawings in more detail and particularly to that of FIGURE 1 and the species therein illustrated, it will there be seen that my invention comprises generally a body structure 10 supporting the vertically disposed hose roller 11 and fastening structure 12 to position the device relative to the tire 13 and a substantially planar, horizontal supporting surface therebelow (not shown).

Body structure 10 comprises sheet-like planar base 14 structurally communicating with upright 15 in its medial part. The upright in turn carries upper roller support 16, projecting horizontally forward from its forward surface. These members are preferably joined, in the configuration illustrated, by welding or similar means, though in this specie it is not necessary that the upper roller support be attached to upright 15, if it fit closely.

The configuration and dimensioning of these members is somewhat critical. The forward projection of base 14 forwardly of upright 15 must be such as to allow operative positioning of roller 11 thereon and the upward extension of upright 15 and rearward extension of base 14 therefrom must be such as to operatively position fastening structure 12 in relative to the forward upper part of a tire, but yet maintain the rearwardmost projection of base 14 forwardly of the communication of tire with underlying supporting surface as hereinafter more fully specified.

Roller structure 11 includes elongate, cylindrical roller 17 carried on the shaft of roller stud 18. This stud has a lower threaded portion 19 adapted to be threadedly engaged in hole 20 in the medial portion of base 10 forwardly of upright 15. An appropriately positioned and sized hole 21 is provided in the medial portion of upper roller support 16 to receive the upper part of the stud shank. The roller stud itself is of appropriate length so that when inserted through these holes with its head 22 resting on the upper surface of roller support 16, the lower threaded portion will be engaged in the hole 20. Preferably the roller 17 is of length sufficient to allow some space between its end parts and the opposed surfaces of base and upper roller support, to allow interposition of plural washers 23 to facilitate rotation of the member.

Fastening structure 12 comprises a U-shaped fastening arm having medial horizontal portion 24 structurally communicating with downwardly depending, paired opposed fastening arms 25 and rearwardly extending tire engaging points 26. The lowermost portions of fastening arms 25 have inwardly turned fastening catches 27 adapted to engage the rearward surface of upright 15 to releasably position the member pivotably relative thereto. Tire engaging points 26 are relatively short upwardly curving structures, terminating in a reasonably sharp point to provide engagement with the tread surface of tire 13. Two such points are positioned medially at spaced distances on horizontal portion 24 of the fastening arms so that they project rearwardly into tire engaging position. Preferably the lower extension of fastening arms 25 have handle-like loops 28 to aid in the manual manipulation of the member.

Appropriately positioned holes 29 are provided in the upper portion of upright 15 to allow the tire engaging points 26 to operatively project rearwardly therethrough to come into engagement with a tire therebehind.

The fastening arm is maintained in pivotable communication with the forward surface of upright 15 by a hinge structure including fastening arm 30 and lower arcuate hinge portion 31 cooperating with the forward surface of upright 15 to pivotally support central horizontal portion 24 of the fastening arm in channel 32. This support should allow some pivotable motion of the support arm and some slight lateral motion of the member, as illustrated in FIGURE 2. Fastening arm 30 of the pivot structure is preferably releasably positioned on the forward surface of upright 15 by plural bolts 33 extending therethrough and into threaded engagement with appropriate holes 34 provided in upright 15.

Preferably the fastening arm is formed from metallic, elongate rod-like material having some elasticity to permit a slight elastic deformation of the member in response to manual manipulation so that it may be operated as hereinafter specified. Preferably also, the fastening points 26 are of some reasonably durable material to prevent undue wear or deformation.

From the foregoing description of the structure of my invention, its operation can now be readily understood.

The device is formed to the specifications given and positioned immediately adjacent the outwardly facing tread of a tire, with base 14 supported on the same surface that supports the tire. The rearward extension of the base 14 will not communicate with the tire, but will be immediately adjacent its forward tread with the rearward portion of upright 15 and tire engaging points 26 immediately adjacent the tread. Obviously, various sizings of my device will be required with tires of different sizes, but one model of average dimension will fit a relatively large number of tire sizes.

With the mechanism in this position, and the fastening arm in a pivotable position with its lower part forwardly positioned so that the tire engaging points 26 are immediately adjacent to the tread portion of the tire but not engaged therewith the lower portion of the fastening arm is manually manipulated to move it pivotably rearwardly and engage it behind the rearward surface of upright 15 so that it will be held in this position by inwardly turned fastening catches 27. In this manipulation, there may be some slight lateral movement of the entire fastening member, and if this be not sufficient to allow clearance of the fastening arm past upright 15, appropriate force will cause an elastic deformation that will permit the passage. With the fastening arm in this latter position, the tire engaging points 26 will be turned upwardly into a fastening engagement with the forward surface of the tire to create a downward force causing a frictional communication between the lower surface of base 14 and the support therebelow, so that the entire structure will be quite substantially positioned.

To remove the structure, the fastening arms are released from behind upright 15 and moved pivotably forward to bring tire engaging points 26 out of engagement with tire 13 in reverse of the operation previously specified.

If desired, several such units may be used on the various tires of a vehicle to permit access of hoses about all the various tires at one time.

It should be noted also that if desired, the fastening rods could be split so that each acts independently, or only one-half need be used, but these structures are not so economical as that illustrated and offer no particular advantage.

It should further be noted that the positioning and fastening of my invention might be quite readily accomplished by appropriate manipulation of the device by the foot of a reasonably dexterous mechanic.

A specie of my invention is seen in the illustration of FIGURE 5, et seq. This specie is quite similar to the aforedescribed guard except that fastening structure 12 is supported in upwardly projecting arms 35 formed integrally with upper roller support 16; upper roller support 16 rigidly communicates with upright 15; and fastening structure 12 is formed, as illustrated, with a medial portion 36 pivotably carried by arms 35 and a rearward portion 37 adapted to be releasably held in tire engaging position by spring biasing means 38. Here also the corners 39 of the base member are downturned to provide a more positive communication with a supporting surface particularly if it have rock or pebbles on it.

The functioning of this specie is very similar to that previously described except that the manipulation is sometimes more simple, especially if accomplished with the foot.

The foregoing description of my invention is necessarily of a detailed nature so that a specific embodiment of it may may be set forth as required, but it is nevertheless to be understood that various rearrangement and multiplication of parts and modification of detail may be resorted to without departing from the spirit, essence and scope of the invention.

Having thusly described my invention, what I desire to protect by Letters Patent, and

What I claim is:

1. A tire hose guard of the nature aforesaid, comprising a combination:
    a body structure, including a base, a medial upright and an upper roller support;
    a roller journaled on said body structure in a substantially vertical position forwardly of said upright and between said base and said upper roller support; and
    a fastening structure, including a fastening arm, with at least one rearwardly projecting fastening element adapted to releasably communicate with the tread portion of a tire therebehind, said fastening structure pivotably supported on the upper portion of said body structure to releasably position said body structure relative to said tire by exerting a downward force on said body structure to cause increased frictional engagement between said body and a supporting surface thereunder.

2. The invention of claim 1 further characterized by said base having its corner portions downturned to provide a positive communication with an irregular supporting surface.

3. The invention of claim 1 further characterized by said fastening structure including a U-shaped element pivotably mounted on the upper portion of said upright to move rearwardly projection tire engaging points from a tire engaging position to a non-engaging position.

4. The invention of claim 3 further characterized by said fastening structure being formed with inwardly projecting fastening catches on the lower leg extensions of said fastening element, said fastening catches adapted to releasably maintain said member in pivotal position relative said upright structure and be manually manipulable to pass thereby.

5. The invention of claim 1 further characterized by said fastening structure including a U-shaped element mounted on paired, laterally spaced uprights for pivotable motion, with a mechanical biasing means carried by said body to releasably engage said fastening member to maintain it in the engaging position.

References Cited
UNITED STATES PATENTS

| | | | |
|---|---|---|---|
| 2,603,432 | 7/1952 | Paulsen | 254—190 |
| 2,814,460 | 11/1957 | Marcolongo | 254—190 |
| 2,846,189 | 8/1957 | MacLaughlin | 254—190 |

RICHARD E. AEGERTER, *Primary Examiner.*

H. HORNSBY, *Assistant Examiner.*